(No Model.) 5 Sheets—Sheet 1.
S. C. MENDENHALL.
TONGUE AND CASTER ATTACHMENT FOR AGRICULTURAL IMPLEMENTS.
No. 280,209. Patented June 26, 1883.
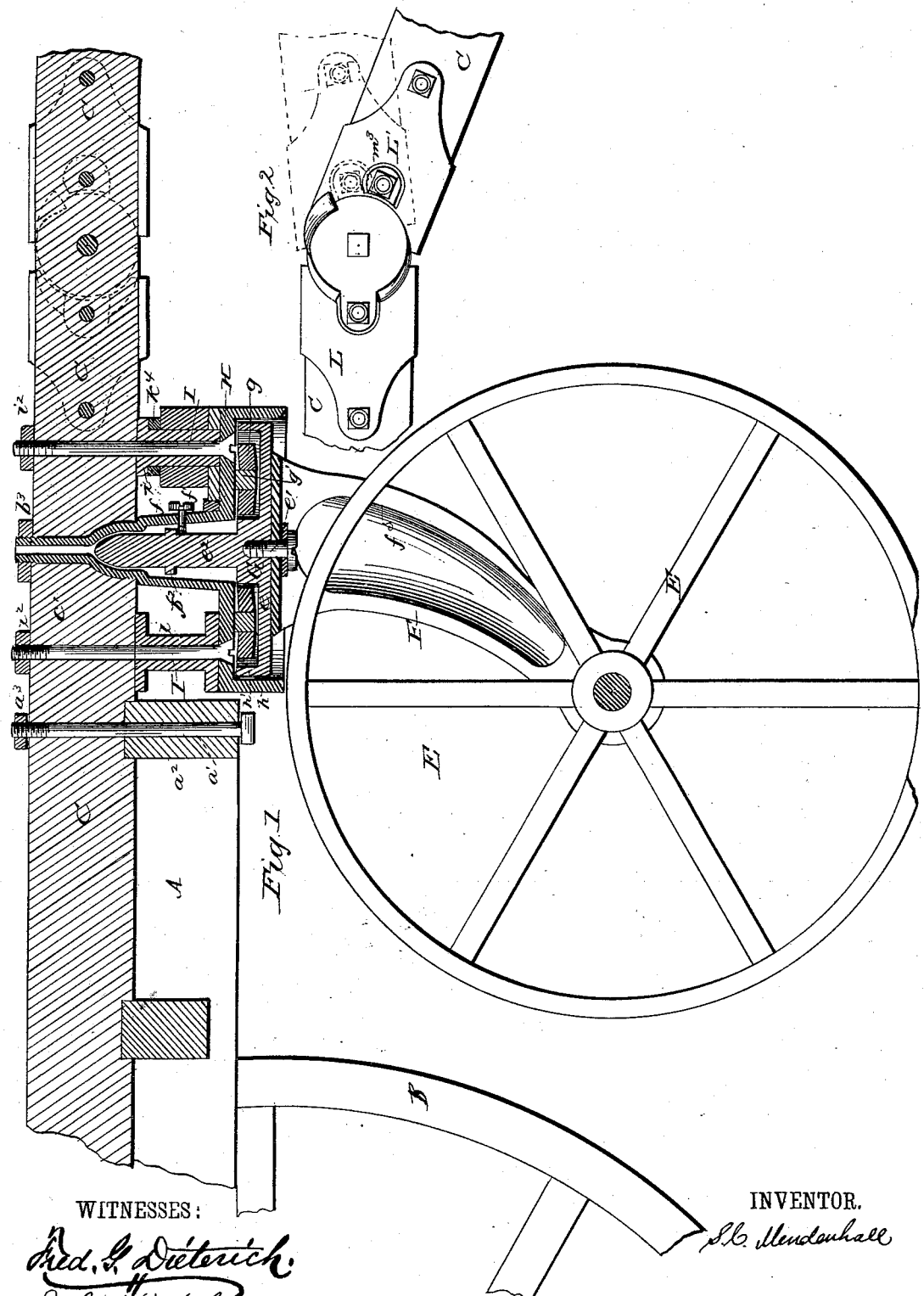
WITNESSES:
Fred. G. Dieterich.
J. G. Hinkel.
INVENTOR.
S. C. Mendenhall
ATTORNEYS

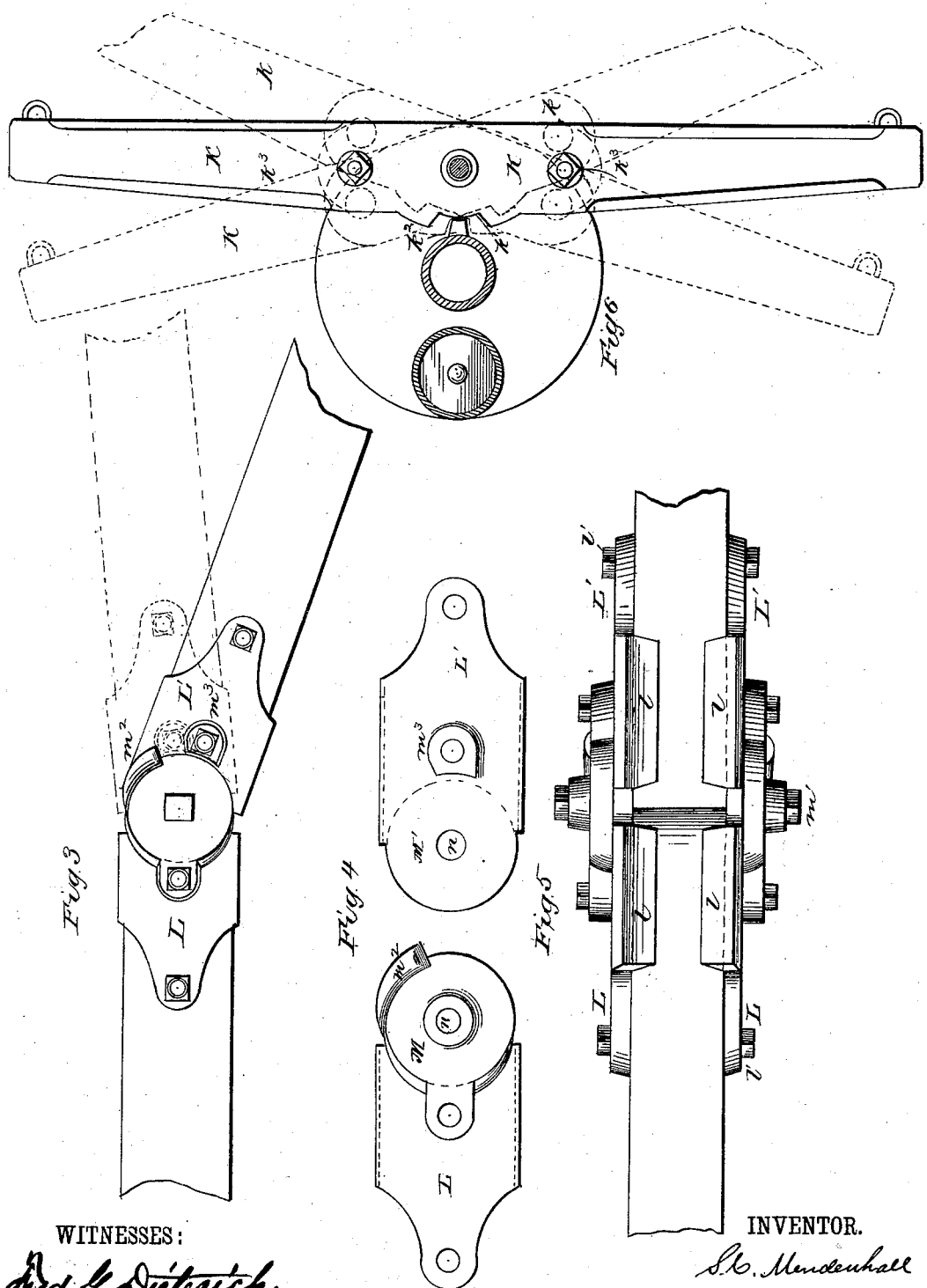

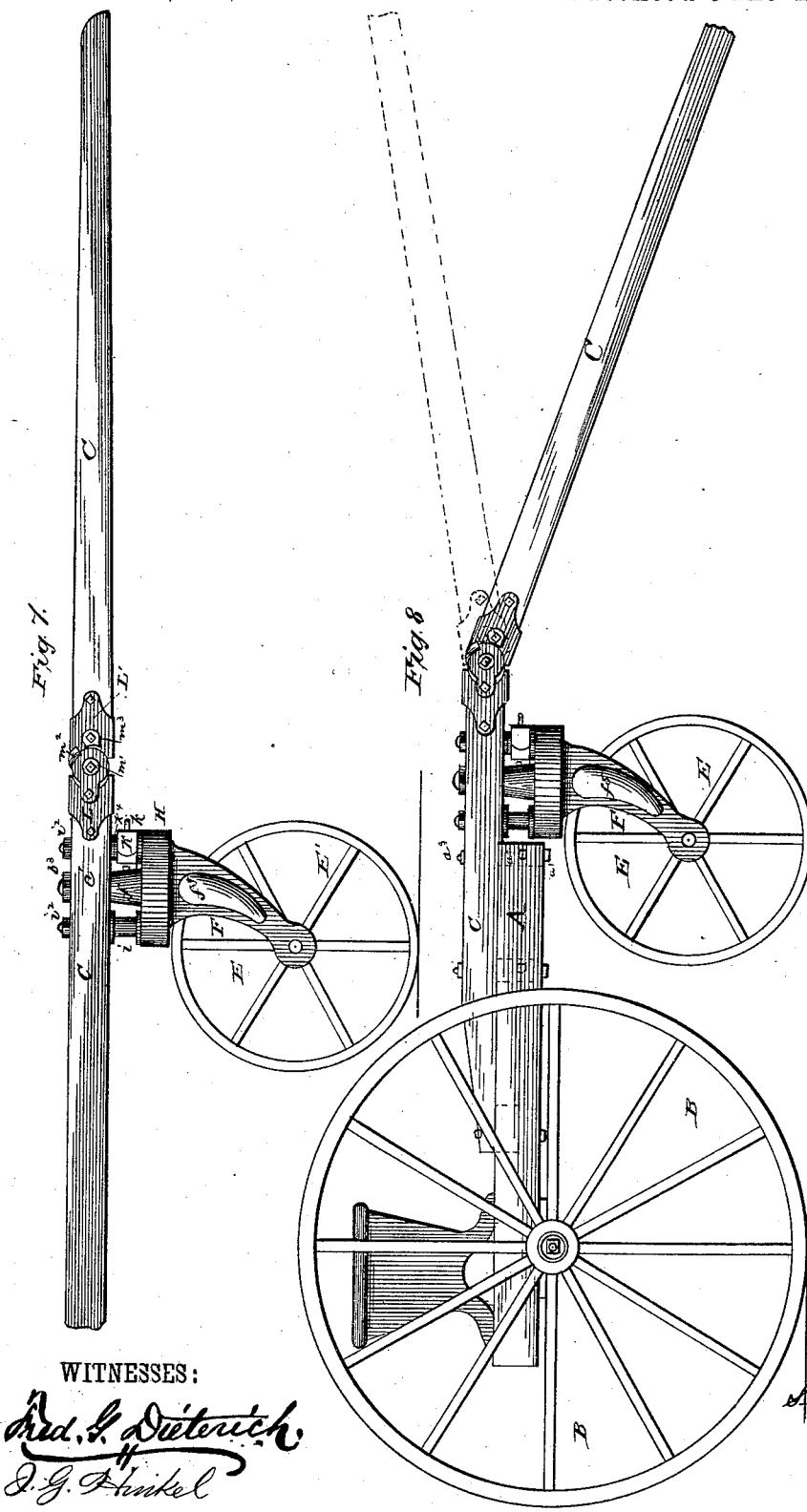

(No Model.) 5 Sheets—Sheet 4.
S. C. MENDENHALL.
TONGUE AND CASTER ATTACHMENT FOR AGRICULTURAL IMPLEMENTS.
No. 280,209. Patented June 26, 1883.
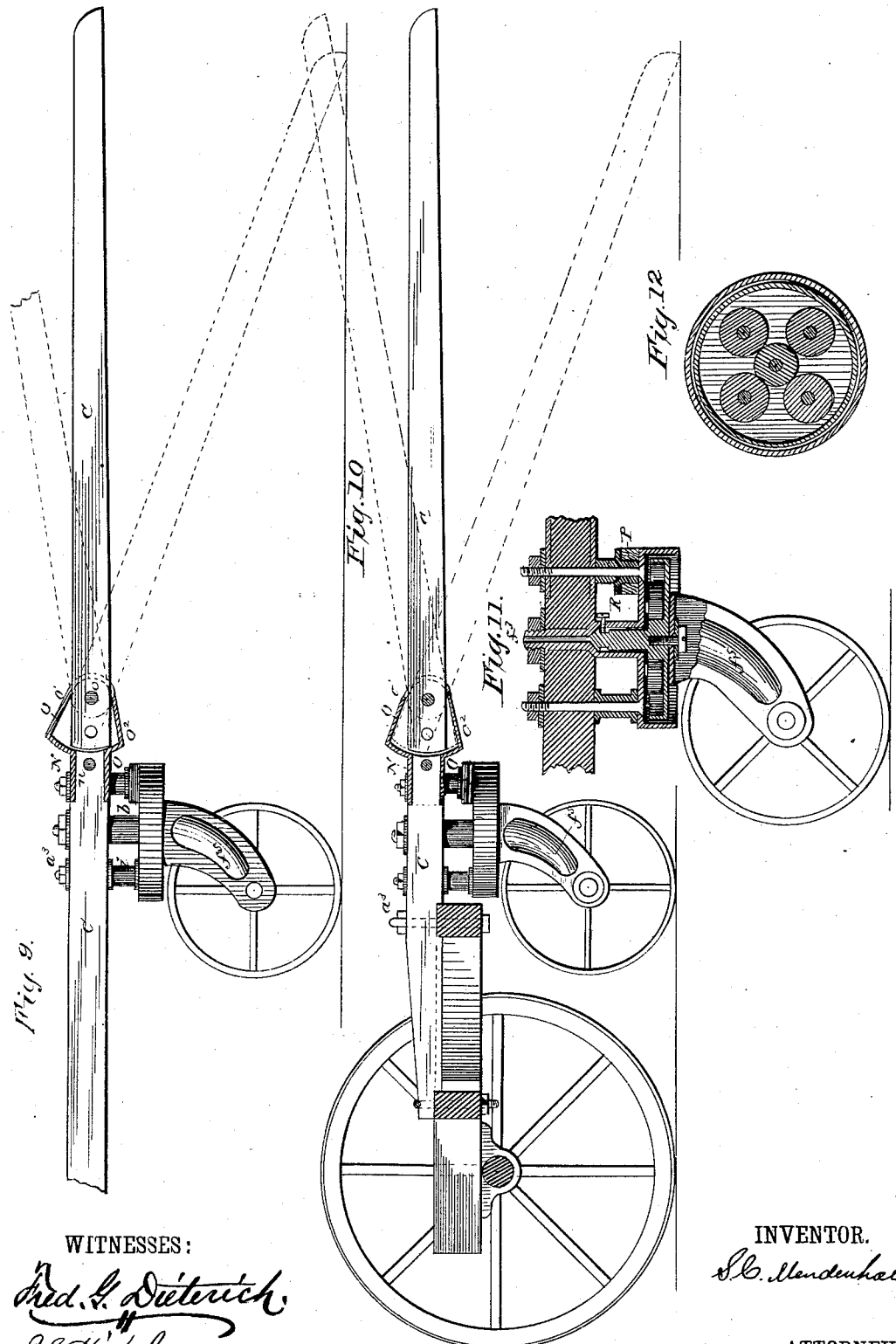
WITNESSES:
INVENTOR.
ATTORNEYS.

(No Model.) 5 Sheets—Sheet 5.
S. C. MENDENHALL.
TONGUE AND CASTER ATTACHMENT FOR AGRICULTURAL IMPLEMENTS.
No. 280,209. Patented June 26, 1883.
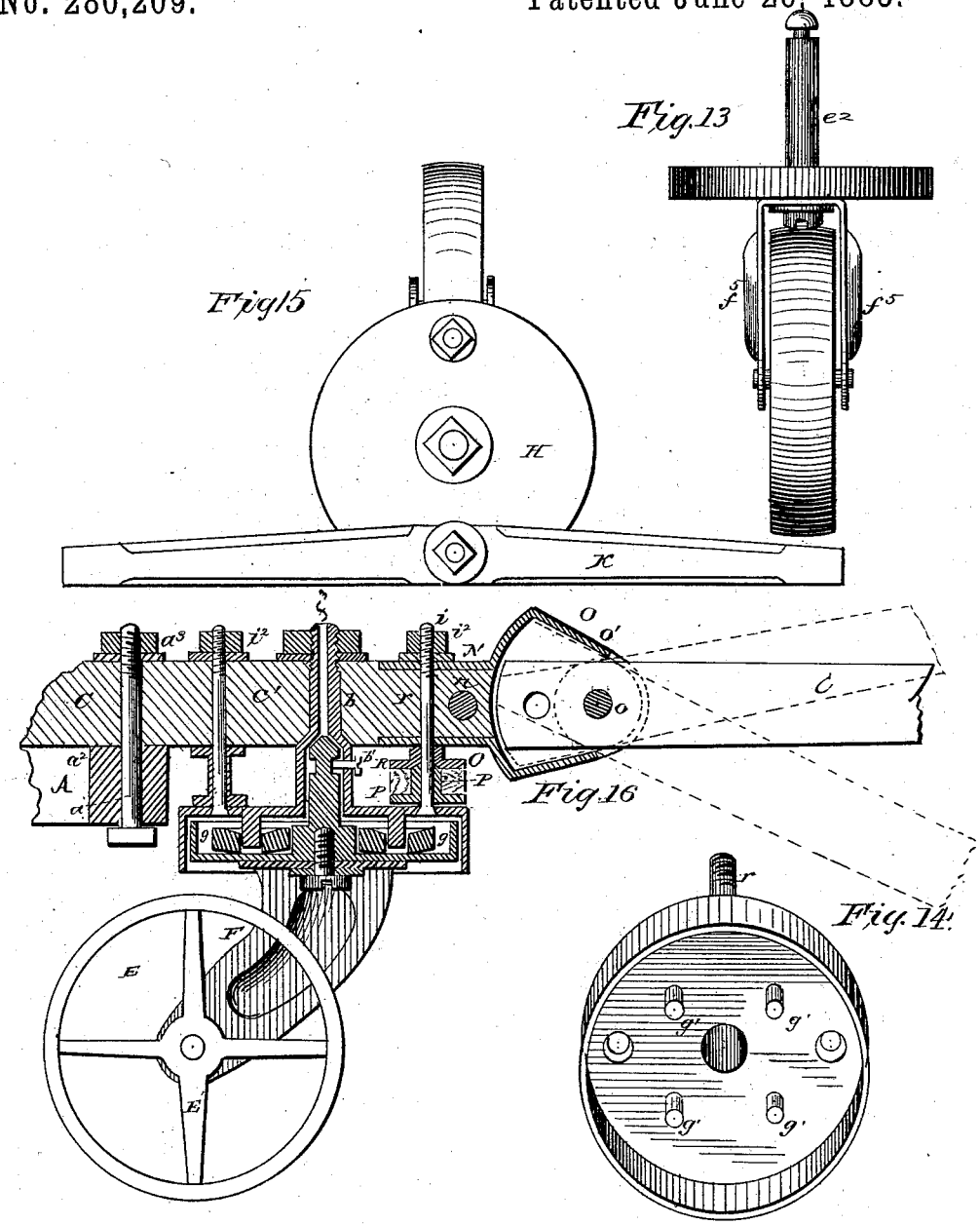

UNITED STATES PATENT OFFICE.

STEPHEN C. MENDENHALL, OF RICHMOND, INDIANA.

TONGUE AND CASTER ATTACHMENT FOR AGRICULTURAL IMPLEMENTS.

SPECIFICATION forming part of Letters Patent No. 280,209, dated June 26, 1883.

Application filed August 16, 1882. (No model.)

*To all whom it may concern:*

Be it known that I, STEPHEN C. MENDENHALL, a citizen of the United States, residing at Richmond, in the county of Wayne and State of Indiana, have invented certain new and useful Improvements in Tongue and Caster Attachments for Agricultural Implements and other Vehicles, of which the following is a specification, reference being had therein to the accompanying drawings.

My invention relates to certain new and useful improvements in seeding-machines and other agricultural implements and vehicles, and more particularly to the class of machines in which the front of the frame and tongue is supported on a caster-wheel, so as to obviate the weight and downward pressure upon the necks of the team, and to also more thoroughly steady the machine in passing over uneven ground. Experience has demonstrated that under the most ordinary circumstances the caster attachment heretofore used can be applied to but one class of machines without interfering with the other parts of the working mechanism.

The object of my present invention is to obviate these defects and produce a tongue and caster attachment adapted to any of the agricultural implements now in use, whether for tilling the soil or for the purpose of being adapted for the heavy-draft machines used in harvesting; and to this end the invention consists in novel features of construction and combination and arrangement of parts in obviating the above-described objections and producing a caster attachment that involves simplicity in construction and effectiveness in operation, all as will be hereinafter fully described, and specifically set forth in the claims hereto annexed.

Referring to the accompanying drawings, forming a part of this specification, Figure 1 is an enlarged longitudinal central vertical sectional view of my improved attachment; Fig. 2, a detached view of the tongue attachment, showing in plain and dotted lines the different vertical positions the front section of the tongue may assume relative to the rear section thereof above and below a horizontal line; Fig. 3, a similar view with the horizontal line removed; Fig. 4, a side elevation, showing the front and rear portions of the tongue-hinge detached. Fig. 5 is a top view of the sectional tongue-hinge; Fig. 6, a plan or top view of caster-bed or top plate, showing in plain and dotted lines the different positions the double-tree may assume and the stop attachment relative thereto; Fig. 7, a side elevation, showing the sectional tongue as connected together and the caster attachment; Fig. 8, a side elevation, showing the sectional tongue, with the rear section thereof "carrying the caster attachment" rigidly connected to the frame of a seeding-machine; Figs. 9 and 10, side elevations, respectively, of modifications shown in Figs. 7 and 8; Fig. 11, a partially-vertical sectional view of a modification of the caster attachment shown in Fig. 1; Fig. 12, a horizontal section through the anti-friction wheels shown in Fig. 1; Fig. 13, an end view of the wheel, saddle, saddle-plate, and pintle; Fig. 14, a view in perspective of the caster-bed or top plate; Fig. 15, a plan or top view of a modification of Fig. 6; Fig. 16, a vertical central section of a modification of the caster attachment shown in Fig. 1.

In the drawings, A represents the frame of the agricultural implement or vehicle; B B, the usual carrying and supporting wheels; C, the sectional tongue, and E the caster which supports the front frame of the implement or vehicle. The saddle-plate $e$ of the caster has secured to its under side by a screw, $e'$, the downwardly-projecting arms F, in the lower end of which the wheel $E'$ is journaled, and which arms and upper part thereof are stamped or struck up in one piece from sheet-steel, so as to swell the sides $f^3$ of the arms and give additional strength and rigidity, while greatly lessening the amount of material generally used in their construction. Connected to or forming an integral part of saddle-plate $e$ of the caster is the pintle $e^2$, which projects up into the pintle shell or case $f$, and secured therein by a set-screw, $f'$, impinging on the under side of a surrounding rim, $f^2$, of the pintle. The shell or case of the pintle projects up through the rear section, $c'$, of the tongue, and is secured thereto by a screw-nut engaging a screw-thread on the outer and projecting end thereof, and which pintle shell or case has a hole, $f^3$, down through it for the passage of material for lubricating the pintle. The pintle at its lower connection with the saddle-plate is provided with an enlarged horizontal circular bearing, G, forming a central anti-friction wheel for the pintle, around which the series of horizontal anti-friction wheels $g$ revolve, and which wheels are loosely mounted on vertical bearings $g'$, connected to or formed integral with the top plate, H, of the caster. The top plate is provided with a downward circular flaring rim, $h$, which forms a continuous scraper for the caster-wheel, and also surrounds the upper circular flange, $h'$, of the saddle-plate, both of which protect and prevent dirt, &c., from getting inside of and clogging the anti-friction wheels of the caster.

To form additional security and mode of attachment of the caster to the rear section of the tongue, tubular flanged bearings $i$ $i'$ are arranged intermediate of the top caster-plate and the tongue, and connected thereto by the headed screw-bolt I, passing up through the top caster-plate bearings, and tongue, and secured by screw-nuts $i^2$.

K represents a whiffletree surrounding the flanged bearing $i'$, and having a bearing-plate, $k$, connected to the under side thereof by bolts $k^3$ $k^3$, and also surrounding said bearing, having notch $k'$ cut out of its rear side, into which projects a lug, $k^2$, connected to or formed integral with the shell or case of the pintle, to permit the double-tree to have the necessary vibration, all as clearly shown in plain and dotted lines, Fig. 6. The flanged bearing $i'$ may be provided with one or more washers, $k^4$, to adapt it to different thicknesses of double-tree, as may be found necessary in applying the caster attachment. The rear section, $c'$, of the tongue C, in rear of the caster attachment, is rigidly connected to the frame or body A of the implement or vehicle by a headed screw-bolt, $a'$, passing up through front cross-rail, $a^2$, and tongue, and secured thereto by screw-nut $a^3$. The hinges for pivotally connecting the two sections of the tongue together are formed of four metallic clamping-plates, L L L' L', having embracing-flanges $l$, the two plates L L being clamped to the opposite side of the front end of the rear section of the tongue by headed screw-bolts $l'$, passing through said plates and rear section, and secured rigidly thereto by a screw-nut; and the plates L' L' are clamped to the rear end of the front section of the tongue in a similar manner.

The clamping-plates L have circular plates M extending beyond and above their ends, and cast or formed integral therewith, and the clamping-plates L' L' have plates M', which, when passed under the plates M sufficiently to have their holes $m$ therein correspond with each other, are then connected together by a bolt, $m'$, passing through them, thus forming the hinged connection between the two sections of the tongue, while the rear ends of the front section of the tongue are made convex, in order to slip in concave ends of the rear section when connected together.

On the upper forward edge of the plates M are circular lugs $m^2$, cast or formed integral therewith, and which have square ends, that impinge against shoulders $m^3$ on the plates L', thus limiting the upward movement of the forward section of the tongue, as shown in dotted lines, Fig. 3.

In Figs. 9, 10, 11, and 16, I have shown modifications of the manner of pivotally connecting the two sections of the tongue together, and in the connection of the bed or top plate of the caster attachment and double-tree to the tongue. The rear section of the tongue has secured to its forward end a hollow metallic case, N, passing over and secured thereto by a bolt, $n$, said case having connected to its end a curved and triangular metallic socket, O, for the reception of the rear end of the front section of the tongue, pivoted therein by a bolt, $o$, passing through it and the sides of the socket, and limited in its up-and-down movement by the slanting upper and lower sides, $o'$ $o^2$, of the socket, and the tongue made rigid from lateral movement by the sides of the socket and case.

In the latter modification above referred to the double-tree is connected to the tongue and bed or top plate of the caster by a lower tubular flanged section, P $p$, and an upper tubular flanged section, R, having its opening concave, and in which rests the convex upper end of the tubular section P, which sections are arranged intermediate of the bed or top plate of the caster and tongue, and all the above-named parts rigidly connected together by a bolt, $r$, passing up through them, as shown in Figs. 11 and 16.

By the above-described construction of caster attachment, and by using horizontal anti-friction wheels instead of vertical wheels, I am enabled to bring the bed or top plate nearer to the tongue, and thereby enabling me to use a caster-wheel of much larger diameter than heretofore used, by which greater advantages are accomplished in passing over uneven ground, and producing a much stronger caster attachment, and by which, in connection with my improved sectional tongue, I am enabled to apply it to agricultural implements and other vehicles, outside of and in front of the frame thereof, thus enabling a greater extent of range, in applying the caster attachment, with reference to the supporting-wheels, which is very advantageous in applying it to different implements or vehicles.

Having thus described my invention, what I claim as new, and desire to secure by Letters Patent, is—

1. A tongue attachment for agricultural implements or vehicles, constructed in two sections, the rear section thereof rigidly attached to any implement or vehicle, and the front section pivotally connected to the forward end of the rear section, in front of an anti-friction caster rigidly secured to said rear section, forward of the frame, whereby the front section is adapted to be moved up and down, while the two sections, in moving laterally, form a single rigid tongue, substantially as and for the purpose specified.

2. In a caster attachment, the stationary saddle-plate $e$, with its elevated circular flange $h'$, whereby a cup for containing liquid is formed to prevent friction, in combination with the downwardly-projecting circular flange $h$ of the caster or top plate, H, within which the flange $h'$ is adapted to revolve, substantially as and for the purpose set forth.

3. In a caster attachment, the pintle having a rigid central bearing-wheel, in combination with the series of horizontal anti-friction wheels surrounding and bearing against the periphery of said central wheel, substantially as and for the purpose specified.

4. In a caster attachment, the rigid lugs on the under side of the bed or top plate, forming journals for the horizontal anti-friction wheels, and in combination therewith, substantially as and for the purpose specified.

5. In a caster attachment, the pintle shell or case of the bed or top plate extending above the bearing of the upper end of the pintle, and provided with a shoulder with shank extending above through the tongue, with a screw and nut to secure the caster attachment to the tongue or other article to be moved, and said shank having an oil-hole through the same communicating with the head of the pintle, substantially as specified.

6. In a caster attachment, the combination of a caster-bed or top-plate lug, $k^2$, and the double-tree plate $k$, having a wide notch, $k'$, the sides of which impinge against the lug to form stops for the double-tree, substantially as described.

7. The combination of the caster-bed or top-plate hollow tube $i'$, bolt, and double-tree, substantially as and for the purpose herein shown and described.

8. The combination of the caster-bed or top plate, stops, and lug, the tube $i$, bolt I, and tongue, substantially as and for the purpose specified.

9. In a caster attachment, the combination, with the caster-wheel, of the continuous scraper formed by the lower beveled edge of the circular depending flange $h$, substantially as herein shown and described.

10. In a caster attachment, the saddle stirrups or arms constructed from a single piece of metal, with swelled sides, substantially as herein shown and described.

11. The saddle stirrups or arms constructed of one piece of metal, with swelled sides, in combination with pintle having solid bearing-wheel, substantially as herein shown and described.

12. In a caster attachment, the combination of the caster-bed or top-plate double-tree, tongue, and bolt connecting said parts, substantially as and for the purpose specified.

13. The combination, with the tongue, of the double hinge composed of clamping-plates pivotally connected together independently of the tongue, and rigidly to the opposite sides of the two sections composing the tongue, substantially as herein shown and described.

14. The double tongue hinge, composed of four metallic parts pivotally connected together independent of the tongue, in combination with the sections $c c'$, composing the tongue C, rigidly connected to said plates, substantially as herein shown and described.

15. Each part of the hinge connecting the two sections of the tongue provided with stops $m$, which limit the upward motion of the tongue, substantially as and for the purpose specified.

16. The combination of the caster attachment and sectional tongue attachment, and means for connecting them together, substantially as and for the purpose herein shown and described.

In testimony whereof I affix my signature in presence of two witnesses.

STEPHEN C. MENDENHALL.

Witnesses:
   WM. H. BATES,
   D. C. ALLEN.